United States Patent [19]

Takahashi et al.

[11] Patent Number: 5,169,243

[45] Date of Patent: Dec. 8, 1992

[54] DYNAMIC PRESSURE BEARING FOR AN X-RAY TUBE HAVING A ROTARY ANODE

[75] Inventors: Takeshi Takahashi, Kashiwara; Ken-ichi Kakumoto, Osaka, both of Japan

[73] Assignee: Koyo Seiko Co., Ltd., Osaka, Japan

[21] Appl. No.: 763,164

[22] Filed: Sep. 20, 1991

[30] Foreign Application Priority Data

Sep. 28, 1990 [JP] Japan .............................. 2-103028[U]

[51] Int. Cl.⁵ ............................................. F16C 33/12
[52] U.S. Cl. ................... 384/107; 384/907.1; 384/912
[58] Field of Search ............... 384/107, 112, 113, 114, 384/123, 912, 907.1

[56] References Cited

FOREIGN PATENT DOCUMENTS

0240674A2 10/1987 European Pat. Off. .
0373705A3  6/1990 European Pat. Off. .
3922279A1  1/1990 Fed. Rep. of Germany .
59-132551  7/1984 Japan .
60-97536   5/1985 Japan .

*Primary Examiner*—Lenard A. Footland
*Attorney, Agent, or Firm*—Wenderoth, Lind & Ponack

[57] ABSTRACT

A dynamic pressure bearing for an X-ray tube having a rotary anode has a cylinder member for supporting the anode and a shaft member fitted in the cylinder member. Between the cylinder member and the shaft member is formed a given clearance, which is filled with lubricant formed of either gallium or gallium alloy. The shaft member has on its outer peripheral surface a plurality of grooves for generating dynamic pressure. A body of each of the cylinder member and the shaft member is formed of ceramic which has corrosion resistance against gallium and gallium alloy of the lubricant. The grooves for generating dynamic pressure can be easily worked on the body of the shaft member because it is formed of ceramic having a good workability. Glass, tantalum or tantalum alloy can be used instead of ceramic.

3 Claims, 3 Drawing Sheets

DYNAMIC PRESSURE BEARING FOR AN X-RAY TUBE HAVING A ROTARY ANODE

BACKGROUND OF THE INVENTION

1. Field of the Invention

The present invention generally relates to a dynamic pressure bearing having grooves for generating dynamic pressure on either its cylinder member or its shaft member and, more particularly, to a dynamic pressure bearing for an X-ray tube having a rotary anode wherein lubricant made of gallium or gallium alloy is used.

2. Description of the Prior Art

A dynamic pressure bearing of this type, which is disclosed in the Japanese Patent Application Laid-open Publication No. 60-97536, has a cylinder member for supporting a rotary anode of an X-ray tube, a shaft member accommodated in the cylinder member in a manner that a given clearance is formed therebetween, and grooves formed on an inner peripheral surface of the cylinder member and/or on an outer peripheral surface of the shaft member for generating dynamic pressure. The clearance between the cylinder member and the shaft member is filled with lubricant made of gallium or gallium alloy.

The reason for use of gallium or gallium alloy as lubricant is that the lubricant is required to resist severe conditions of vacuum and high temperatures in the clearance between the cylinder member and the shaft member.

It is important that the cylinder member and the shaft member, which always contact the lubricant, should be made of a metallic material having corrosion resistance against gallium and gallium alloy. In the above dynamic pressure bearing, tungsten (W) or tungsten alloy is used as a material for the cylinder member and the shaft member.

However, these metallic materials are not only expensive but also difficult to work or machine.

SUMMARY OF THE INVENTION

The object of the present invention is therefore to improve workability of the cylinder and shaft members but decrease a production cost thereof in a dynamic pressure bearing for an X-ray tube having a rotary anode wherein either gallium or gallium alloy is used as In order to achieve the above object, a dynamic pressure bearing for an X-ray tube having a rotary anode comprises a cylinder member for supporting said rotary anode of said X-ray tube; a shaft member fitted in said cylinder member in a manner that a given clearance is formed between said shaft member and said cylinder member, said clearance being filled with lubricant formed of one of gallium and gallium alloy; and a plurality of grooves for generating dynamic pressure, said grooves being formed on at least one of said cylinder member and said shaft member, and is characterized in that a body having grooves for generating dynamic pressure of at least one of said cylinder member and said shaft member is formed of ceramic.

Alternatively, a body having grooves for generating dynamic pressure of at least one of said cylinder member and said shaft member can be formed of glass.

Also, a body having grooves for generating dynamic pressure of at least one of said cylinder member and said shaft member can be formed of either tantalum or a tantalum alloy.

Ceramic, glass, tantalum, and tantalum alloy all have corrosion resistance against gallium and gallium alloy and are cheap and easy to work. Therefore, the cylinder member and the shaft member can be easily worked and produced at a lower cost. Especially, the grooves can be easily worked on the body made of either of such materials.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 4:
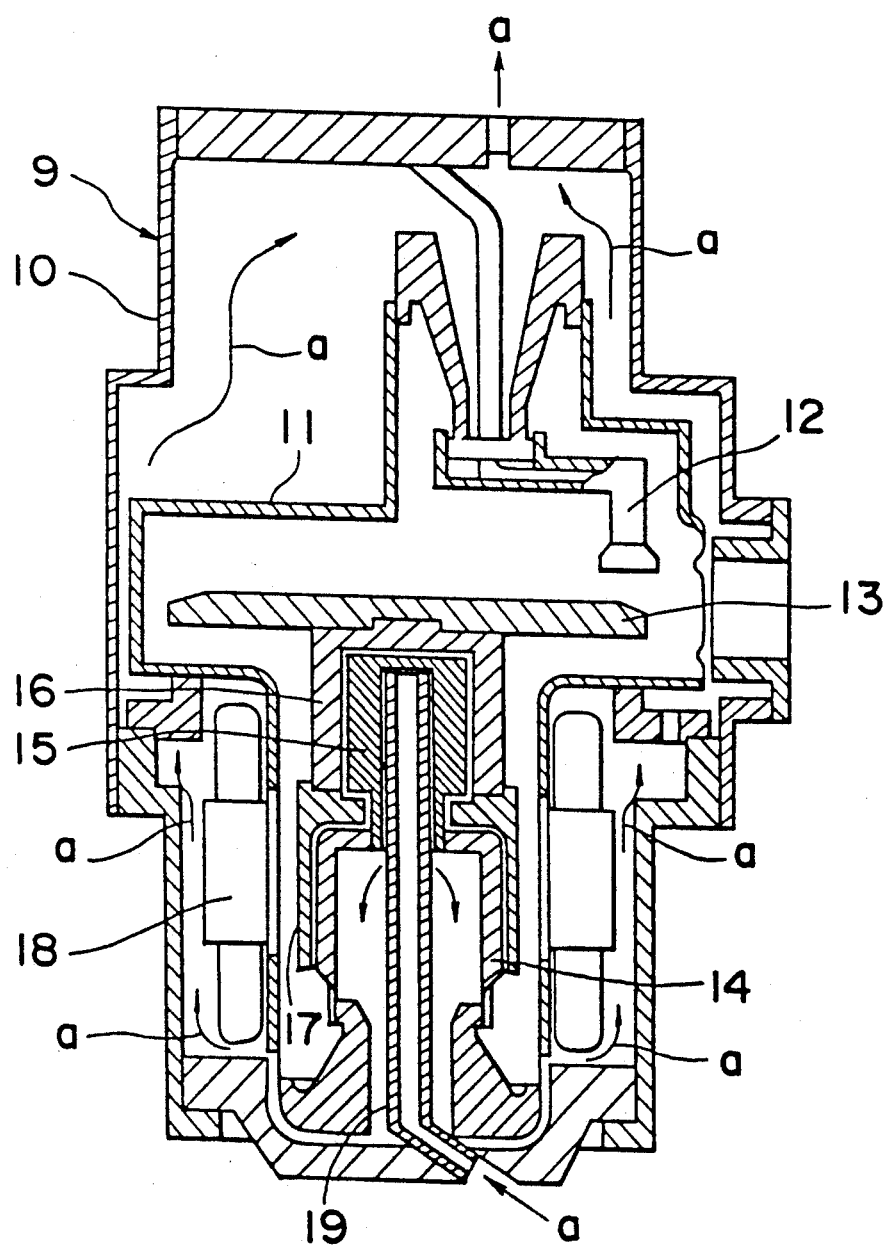
FIG. 4 is a cross sectional view of an X-ray tube device in which a dynamic pressure bearing is installed.

Referring now to FIG. 4, an X-ray tube device 9 has an X-ray tube 11 which is disposed in a housing 10 in a manner that a coolant passage "a" is formed around the X-ray tube 11 inside of the housing 10. The X-ray tube 11 accommodates a cathode 12 and an anode 13 therein.

Inside of the X-ray tube 11, a shaft member 15 of a dynamic pressure bearing according to the present invention is fitted in a top portion of a support block 14. A cylinder member 16 of the dynamic pressure bearing is rotatably fitted around the shaft member 15 so that a clearance "t" (see FIG. 1) is formed between the cylinder member 16 and the shaft member 15.

The anode 13 is fixed to a top of the cylinder member 16 so that the anode 13 rotates together with the cylinder member 16.

Because the principle of generation of X rays is not only well known but also irrelevant to the present invention, a detailed description about it is omitted here.

A rotor 17 is, on one hand, fixed to a lower portion of the cylinder member 16, and on the other hand, freely fitted around the support block 14.

A stator 18 is fixed to a wall opposite the rotor 17 of the X-ray tube 11.

A cooling oil pipe 19 is provided inside the support block 14 and the shaft member 15 in a penetrating manner.

By applying a voltage to the stator 18, the rotor 17 is rotated. The rotation of the rotor 17 causes the cylinder member 16 to rotate together with the anode 13.

Figure 1:
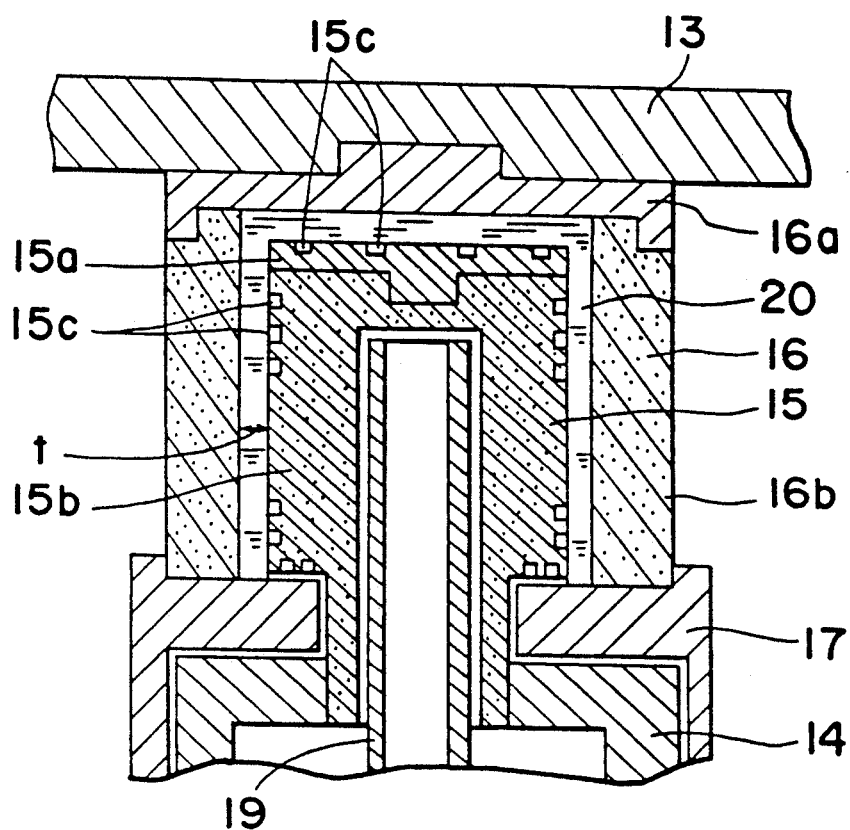
FIG. 1 is a cross sectional view of a dynamic pressure bearing according to an embodiment of the present invention.

As shown in detail in FIG. 1, the clearance "t" between the cylinder member 16 and the shaft member 15 is filled with lubricant 20 made of either gallium or gallium alloy 20.

The cylinder member 16 consists of a little, upper portion 16a to which the anode 13 is fixed, and a lower portion 16b forming a cylindrical body of the cylinder member 16. The upper portion 16a of the cylinder member 16 is made of tungsten alloy and the lower portion or the cylindrical body 16b is made of ceramic. The upper portion 16a is bonded to the lower portion 16b.

Also, the shaft member 15 consists of two portions: an upper portion 15a opposite the upper portion 16a of the cylinder member 16 and a lower portion 15b forming a body of the shaft member 15. Similarly to the cylinder member 16, the upper portion 15a is made of tungsten alloy and the lower portion or the body 15b is made of ceramic. The upper portion 15a is bonded to the lower portion 15b.

The shaft member 15 is provided with a plurality of grooves 15c for generating dynamic pressure on a top surface of its upper portion 15a and an outer peripheral surface of its lower portion 15b.

Figure 3:
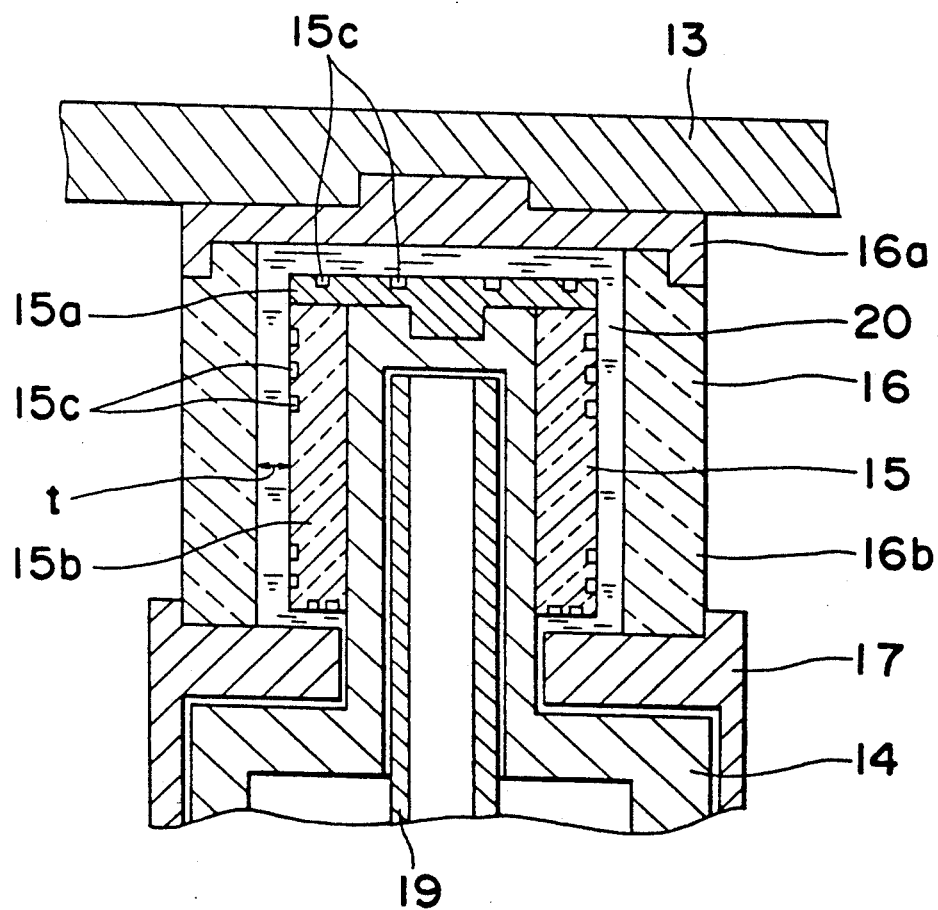
FIG. 3 is a cross sectional view of a dynamic pressure bearing according to a still another embodiment of the present invention.

The lower portion 16b constituting the body of the cylinder member 16 and the lower portion 15b constituting the body of the shaft member 15 can be also made of glass, instead of ceramic, as shown in FIG. 3. Glass functions similarly to ceramic. In this embodiment of FIG. 3, a central portion of the support block 14 extends upward along the cooling oil pipe 19 to the upper portion 15a of the shaft member 15. Accordingly, the lower portion 15b of the shaft member 15 is formed around the extended central portion of the support block 14.

In either of the above embodiments, because most part of the cylinder member 16 and the shaft member 15 is made of ceramic (or glass) and use of tungsten alloy which is expensive and difficult to work is limited to the upper portions 16a and 15b only, the cylinder member 16 and the shaft member 15 can be easily worked. Especially, the grooves 15c can be easily made on the ceramic (or glass) body of the shaft member 15. In addition, a production cost is lowered. Furthermore, especially in the case that ceramic is used, because its coefficient of linear expansion is small, the clearance "t" is hardly changed, and change in torque with temperature hardly occurs.

Figure 2:
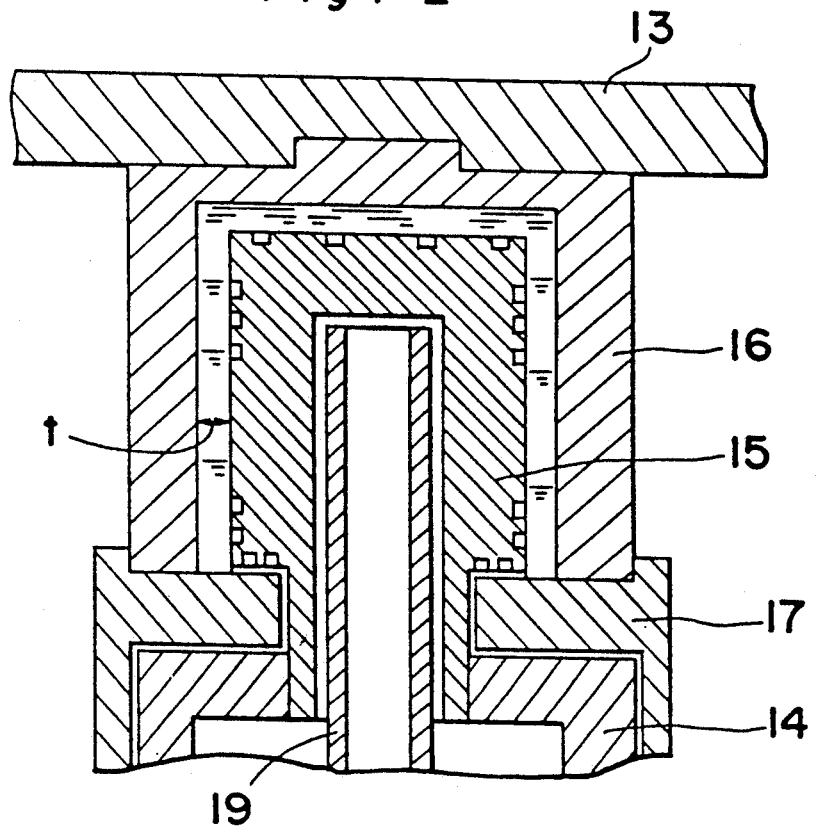
FIG. 2 is a cross sectional view of a dynamic pressure bearing according to another embodiment of the present invention.

If the cylinder member 16 and the shaft member 15 are entirely made of either tantalum or tantalum alloy, as shown in FIG. 2, similar effects and advantages are obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A dynamic pressure bearing for an X-ray tube having a rotary anode, comprising:
    a cylinder member for supporting said rotary anode of said X-ray tube;
    a shaft member fitted in said cylinder member in a manner that a given clearance is formed between said shaft member and said cylinder member, said clearance being filled with lubricant formed of one of gallium and gallium alloy; and
    a plurality of grooves for generating dynamic pressure, said grooves being formed on at least one of said cylinder member and said shaft member, characterized in that:
    a body having grooves for generating dynamic pressure of at least one of said cylinder member and said shaft member is formed of ceramic.

2. A dynamic pressure bearing for an X-ray tube having a rotary anode, comprising:
    a cylinder member for supporting said rotary anode of said X-ray tube;
    a shaft member fitted in said cylinder member in a manner that a given clearance is formed between said shaft member and said cylinder member, said clearance being filled with lubricant formed of one of gallium and gallium alloy; and
    a plurality of grooves for generating dynamic pressure, said grooves being formed on at least one of said cylinder member and said shaft member, characterized in that:
    a body having grooves for generating dynamic pressure of at least one of said cylinder member and said shaft member is formed of glass.

3. A dynamic pressure bearing for an X-ray tube having a rotary anode, comprising:
    a cylinder member for supporting said rotary anode of said X-ray tube;
    a shaft member fitted in said cylinder member in a manner that a given clearance is formed between said shaft member and said cylinder member, said clearance being filled with lubricant formed of one of gallium and gallium alloy; and
    a plurality of grooves for generating dynamic pressure, said grooves being formed on at least one of said cylinder member and said shaft member, characterized in that:
    a body having grooves for generating dynamic pressure of at least one of said cylinder member and said shaft member is formed of one of tantalum and tantalum alloy.

* * * * *